United States Patent
Moshchuk et al.

(10) Patent No.: US 11,787,414 B2
(45) Date of Patent: Oct. 17, 2023

(54) GPS ENHANCED FRICTION ESTIMATION

(71) Applicant: GM Global Technology Operations LLC, Detroit, MI (US)

(72) Inventors: Nikolai K. Moshchuk, Grosse Pointe Farms, MI (US); David Perez-Chaparro, Ferndale, MI (US); Kausalya Singuru, Troy, MI (US); Hualin Tan, Novi, MI (US); Jin-Jae Chen, Canton, MI (US); Ping Mi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 17/383,987

(22) Filed: Jul. 23, 2021

(65) Prior Publication Data
US 2023/0042818 A1 Feb. 9, 2023

(51) Int. Cl.
*B60W 40/068* (2012.01)
*B60W 60/00* (2020.01)
*B60W 30/02* (2012.01)

(52) U.S. Cl.
CPC ........ *B60W 40/068* (2013.01); *B60W 60/001* (2020.02); *B60W 30/02* (2013.01); *B60W 2520/14* (2013.01); *B60W 2520/20* (2013.01); *B60W 2530/20* (2013.01)

(58) Field of Classification Search
CPC .. B60W 40/068; B60W 60/001; B60W 30/02; B60W 2520/14; B60W 2520/20; B60W 2530/20
See application file for complete search history.

(56) References Cited

U.S. PATENT DOCUMENTS

| | | | | |
|---|---|---|---|---|
| 11,186,286 | B2* | 11/2021 | Yi | B60W 40/068 |
| 2002/0087251 | A1* | 7/2002 | Kogure | G01N 19/02 701/80 |
| 2005/0234628 | A1* | 10/2005 | Luders | B60W 40/068 701/80 |
| 2006/0273657 | A1* | 12/2006 | Wanke | B60T 8/17555 303/146 |
| 2010/0211256 | A1* | 8/2010 | Takenaka | B60W 40/068 701/31.4 |
| 2011/0015906 | A1* | 1/2011 | Bian | B60T 8/172 703/2 |
| 2011/0218700 | A1* | 9/2011 | Mori | B60W 10/06 701/31.4 |
| 2018/0319404 | A1* | 11/2018 | Jonasson | B60T 8/172 |
| 2020/0156607 | A1* | 5/2020 | Ueno | B60W 30/02 |
| 2020/0207352 | A1* | 7/2020 | Ogawa | B60W 40/068 |
| 2020/0207361 | A1* | 7/2020 | Ishigami | B60W 40/12 |

* cited by examiner

*Primary Examiner* — Jeff A Burke
*Assistant Examiner* — Madison B Emmett
(74) *Attorney, Agent, or Firm* — CANTOR COLBURN LLP

(57) ABSTRACT

A vehicle and a system and method of controlling the vehicle. The system includes a sensor and a processor. The sensor obtains a first estimate of a force on a tire of the vehicle based on dynamics of the vehicle. The processor is configured to obtain a second estimate of the force on the tire using a tire model, determine an estimate of a coefficient of friction between the tire and the road from the first estimate of the force and the second estimate of the force, and control the vehicle using the estimate of the coefficient of friction.

17 Claims, 9 Drawing Sheets

Friction dependent front/rear axle force-slip relationships

GPS ENHANCED FRICTION ESTIMATION

INTRODUCTION

The subject disclosure relates to operation of an autonomous vehicle, and in particular, to a method of estimating a friction between a tire of the vehicle and a road to improve the operation of the autonomous vehicle along the road based on the friction.

An autonomous vehicle operates to navigate itself along a road given its knowledge of its environment. The autonomous vehicle can use a friction between its tires and the roadway to perform calculations for controlling the vehicle to prevent slipping, improving braking, etc. However, road conditions can vary with weather conditions and from location to location along the road. Under certain road conditions, these changes can be rapid and dramatic, thereby affecting vehicle control. Accordingly, it is desirable have an improved knowledge of road friction to control the vehicle as the road friction changes.

SUMMARY

In one exemplary embodiment, a method of controlling a vehicle is disclosed. A first estimate of a force on a tire of the vehicle is obtained based on dynamics of the vehicle. A second estimate of the force on the tire is obtained using a tire model. An estimate of a coefficient of friction between the tire and a road is determined from the first estimate of the force and the second estimate of the force. The vehicle is controlled using the estimate of the coefficient of friction.

In addition to one or more of the features described herein, the method further includes determining the estimate of the coefficient of friction by reducing a difference between the first estimate of the force and the second estimate of the force. The second estimate of the force is based on a measured slip angle of the tire. The force is at least one of a front lateral force on a front tire, a rear lateral force on a rear tire, a front longitudinal force on the front tire, and a rear longitudinal force on the rear tire. The method further includes determining a low friction condition when a metric based on a measured yaw parameter and a model-based yaw parameter is greater than a threshold value. The method further includes outputting the estimate of the coefficient of friction when at least one of: the estimate is less than one for a selected number of sample times, and the estimate is less than one when a jerk occurring at the vehicle is negative. The tire model is a non-linear tire model.

In another exemplary embodiment, a system for controlling a vehicle is disclosed. The system includes a sensor and a processor. The sensor obtains a first estimate of a force on a tire of the vehicle based on dynamics of the vehicle. The processor is configured to obtain a second estimate of the force on the tire using a tire model, determine an estimate of a coefficient of friction between the tire and a road from the first estimate of the force and the second estimate of the force, and control the vehicle using the estimate of the coefficient of friction.

In addition to one or more of the features described herein, the processor is further configured to determine the estimate of the coefficient of friction by reducing a difference between the first estimate of the force and the second estimate of the force. The second estimate of the force is based on a measured slip angle of the tire. The force is at least one of a front lateral force on a front tire, a rear lateral force on a rear tire, a front longitudinal force on the front tire, and a rear longitudinal force on the rear tire. The processor is further configured to determine a low friction condition when a metric based on a measured yaw parameter and a model-based yaw parameter is greater than a threshold value. The processor is further configured to output the estimate of the coefficient of friction when at least one of: the estimate is less than one for a selected number of sample times, and the estimate is less than one when a jerk occurring at the vehicle is negative. The tire model is a non-linear tire model.

In yet another exemplary embodiment, a vehicle is disclosed. The vehicle includes a sensor and a processor. The sensor obtains a first estimate of a force on a tire of the vehicle based on dynamics of the vehicle. The processor is configured to obtain a second estimate of the force on the tire using a tire model, determine an estimate of a coefficient of friction between the tire and a road from the first estimate of the force and the second estimate of the force, and control the vehicle using the estimate of the coefficient of friction.

In addition to one or more of the features described herein, the processor is further configured to determine the estimate of the coefficient of friction by reducing a difference between the first estimate of the force and the second estimate of the force. The second estimate of the force is based on a measured slip angle of the tire. The force is at least one of a front lateral force on a front tire, a rear lateral force on a rear tire, a front longitudinal force on the front tire, and a rear longitudinal force on the rear tire. The processor is further configured to determine a low friction condition when a metric based on a measured yaw parameter and a model-based yaw parameter is greater than a threshold value. The processor is further configured to output the estimate of the coefficient of friction when at least one of: the estimate is less than one for a selected number of sample times, and the estimate is less than one when a jerk occurring at the vehicle is negative.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
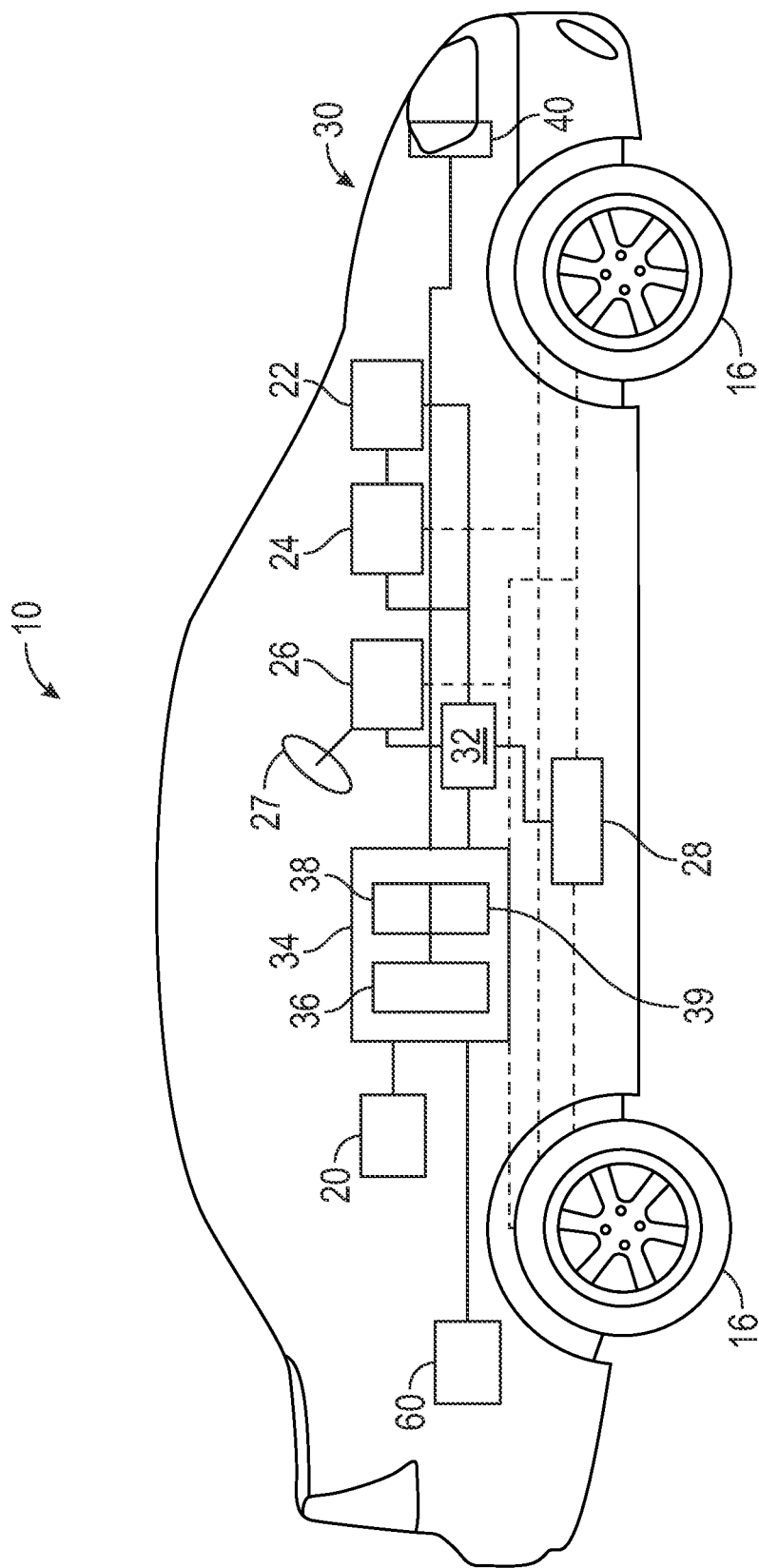
FIG. 1 shows an autonomous vehicle in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensing system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensing system 30 senses objects in an exterior environment of the autonomous vehicle 10 and determines various parameters of the objects useful in locating the position and relative velocities of various remote vehicles in the environment of the autonomous vehicle. The sensing system 30 can include sensors such as digital cameras, radar, Lidar, etc. The parameters of the objects are provided to the controller 34 for vehicle navigation.

The controller 34 includes a processor 36 and a computer readable storage device or computer-readable storage medium 38. The storage medium includes programs or instructions 39 that, when executed by the processor 36, operate the autonomous vehicle 10 based on sensor system outputs. The controller 34 builds a trajectory for the autonomous vehicle 10 based on the output of sensing system 30. The controller 34 can provide the trajectory to the actuator system 32 to control the propulsion system 22, transmission system 24, steering system 26, and/or brake system 28 in order to navigate the autonomous vehicle 10 with respect to the object 50. The computer-readable storage medium 38 may further include programs or instructions 39 that when executed by the processor 36, determines a frictional condition or a coefficient of friction between the one or more wheels 16 of the autonomous vehicle 10 and the road and uses the coefficient of friction to control the operation of the autonomous vehicle based on the coefficient of friction.

A communication system 60 enables communication with a remote device, such as a traffic server, an infrastructure device, a Global Positioning Satellite (GPS) system, etc. and provides data from these remote devices to the controller 34. In various embodiments, the controller 34 uses GPS data to determine vehicle velocity and angle or orientation of the autonomous vehicle 10. This information can be used to determine forces on the autonomous vehicle 10 and thus forces on tires of the autonomous vehicle 10.

Figure 2:
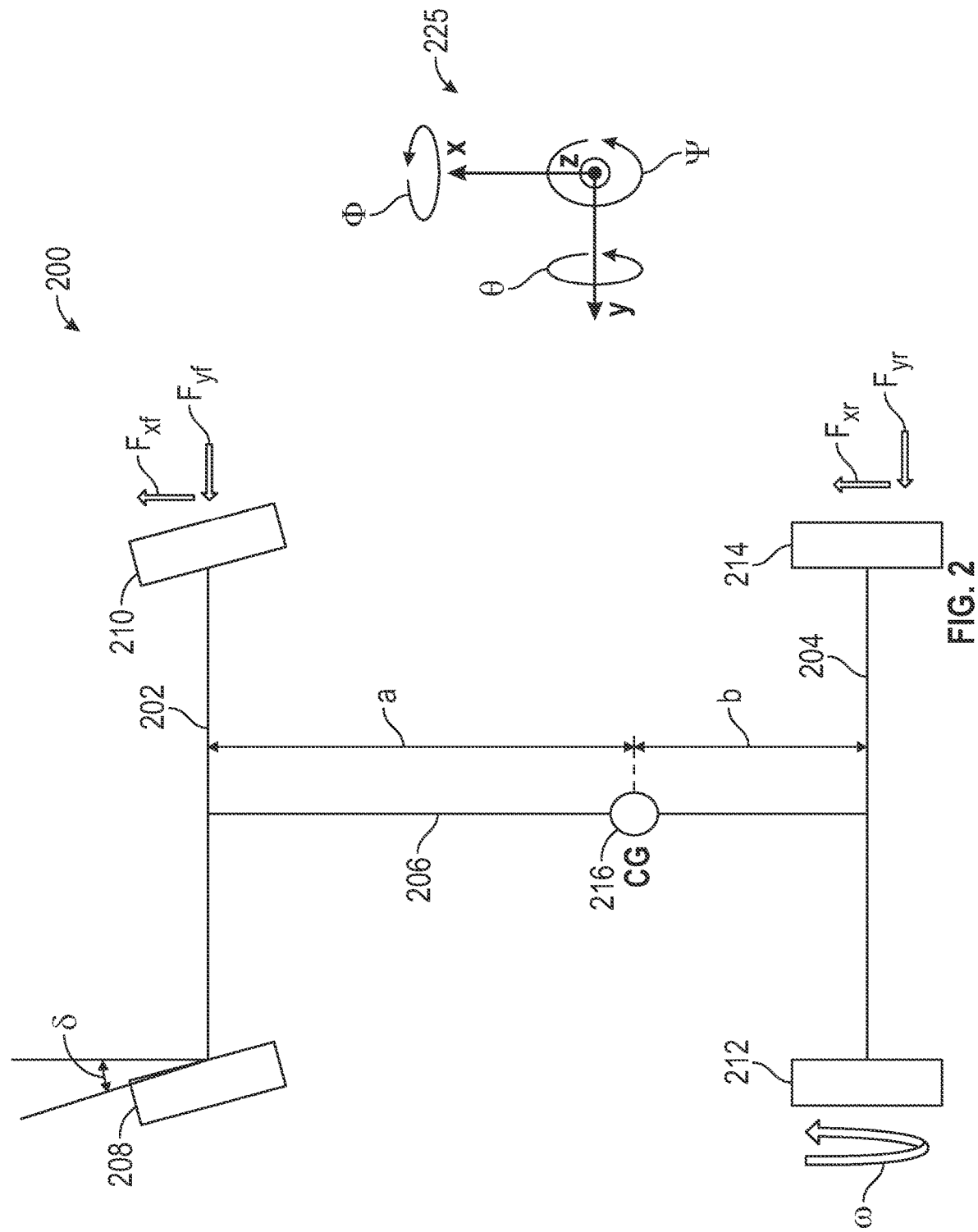
FIG. 2 shows a top view of a chassis of the autonomous vehicle.

FIG. 2 shows a top view of a chassis 200 of the autonomous vehicle 10. The chassis 200 includes a front axle 202, a rear axle 204 and a drive shaft 206 connecting the front axle 202 to the rear axle 204. The front axle 202 includes a left front wheel 208 and a right front wheel 210. The rear axle 204 includes a left rear wheel 212 and a right rear wheel 214. A center of gravity 216 can be found along the drive shaft 206 or in the chassis 200. A front axle length 'a' spans a distance along the drive shaft 206 from the center of gravity 216 to the front axle 202. A rear axle length 'b' spans a distance along the drive shaft 206 from the center of gravity 216 to the rear axle 204.

A body centered coordinate system 225 of the chassis 200 is shown. The body centered coordinate system 225 includes a longitudinal axis (x), a lateral axis (y) and a yaw axis (z) which points out of the page. A rotation about the longitudinal axis is indicated by roll angle $\varphi$. A rotation about the lateral axis is indicated by pitch angle $\theta$. A rotation about the yaw axis is indicated by yaw angle $\psi$.

Force arrows are shown to indicate forces on the tires. The right front wheel 210 shows a longitudinal front wheel force ($F_{xf}$) and a lateral front wheel force ($F_{yf}$). The right rear wheel 214 shows a longitudinal rear wheel force ($F_{xr}$) and a lateral rear wheel force ($F_{yr}$). A steering angle $\delta$ is shown at the left front wheel 208. The steering angle $\delta$ is an angle between the longitudinal axis and the direction in which the tire is pointing. A slip angle is an angle between the direction in which the tire is pointing and the actual direction in which the tire is travelling.

Figure 3:
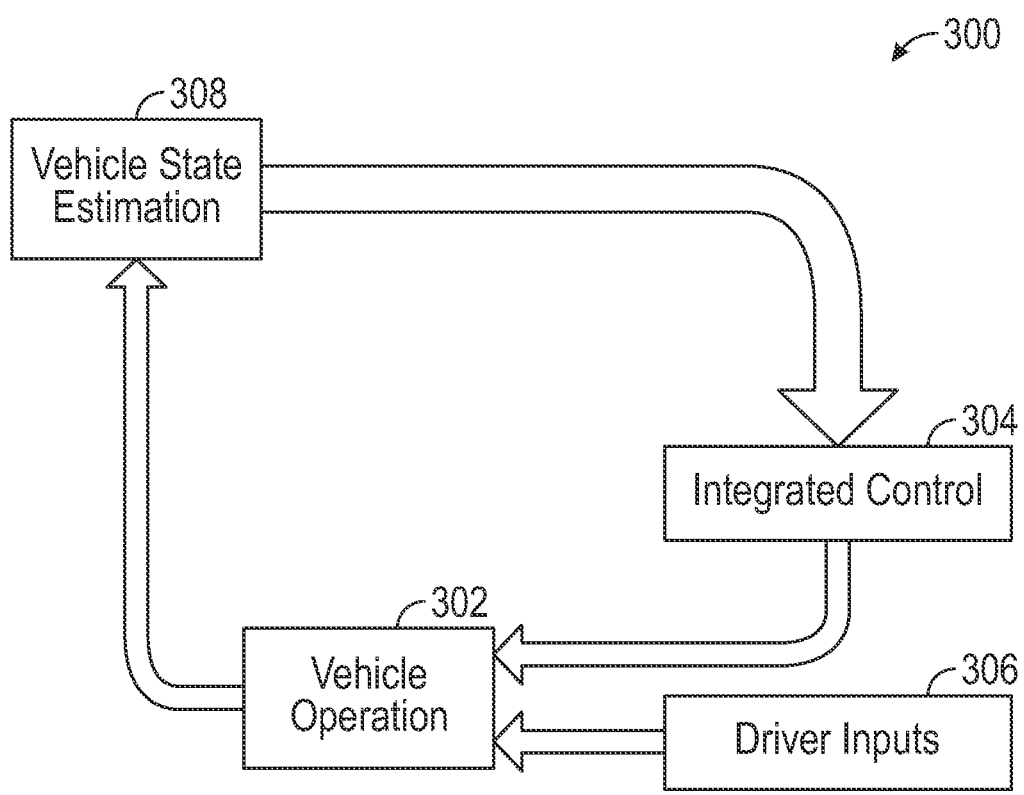
FIG. 3 shows a flow diagram for controlling the autonomous vehicle using the method disclosed herein.

FIG. 3 shows a flow diagram 300 for controlling the autonomous vehicle 10 using the method disclosed herein. The autonomous vehicle 10 includes various modules operating on the processor 36 of the autonomous vehicle 10, including a vehicle operation module 302 for changing a state of the autonomous vehicle 10 (i.e., via acceleration, deceleration, braking, turning, etc.), an integrated control system 304 that provides instructions or signals to the vehicle operation module 302 and a driver input 306 that provides driver's instructions to the vehicle operation module 302. In other embodiments, the modules disclosed herein can be operated on separate processors or circuitry. The vehicle operation module 302 changes the state of the autonomous vehicle 10 based on the data from the integrated control system 304 and from driver input 306. The autonomous vehicle 10 also includes a vehicle state estimation module 308 operating at the processor 36 that evaluates the change in the state of the autonomous vehicle 10 and generates parameters that can be used at the integrated control system for subsequent instructions to the autonomous vehicle 10. In various embodiments, the vehicle state estimation module 308 determines a coefficient of friction between a tire of the autonomous vehicle 10 and the road based on the current state of the vehicle or current dynamics of the vehicle. The integrated control system 304 uses the coefficient of friction in determining the control signals that are sent to the vehicle operation module 302.

Figure 4:
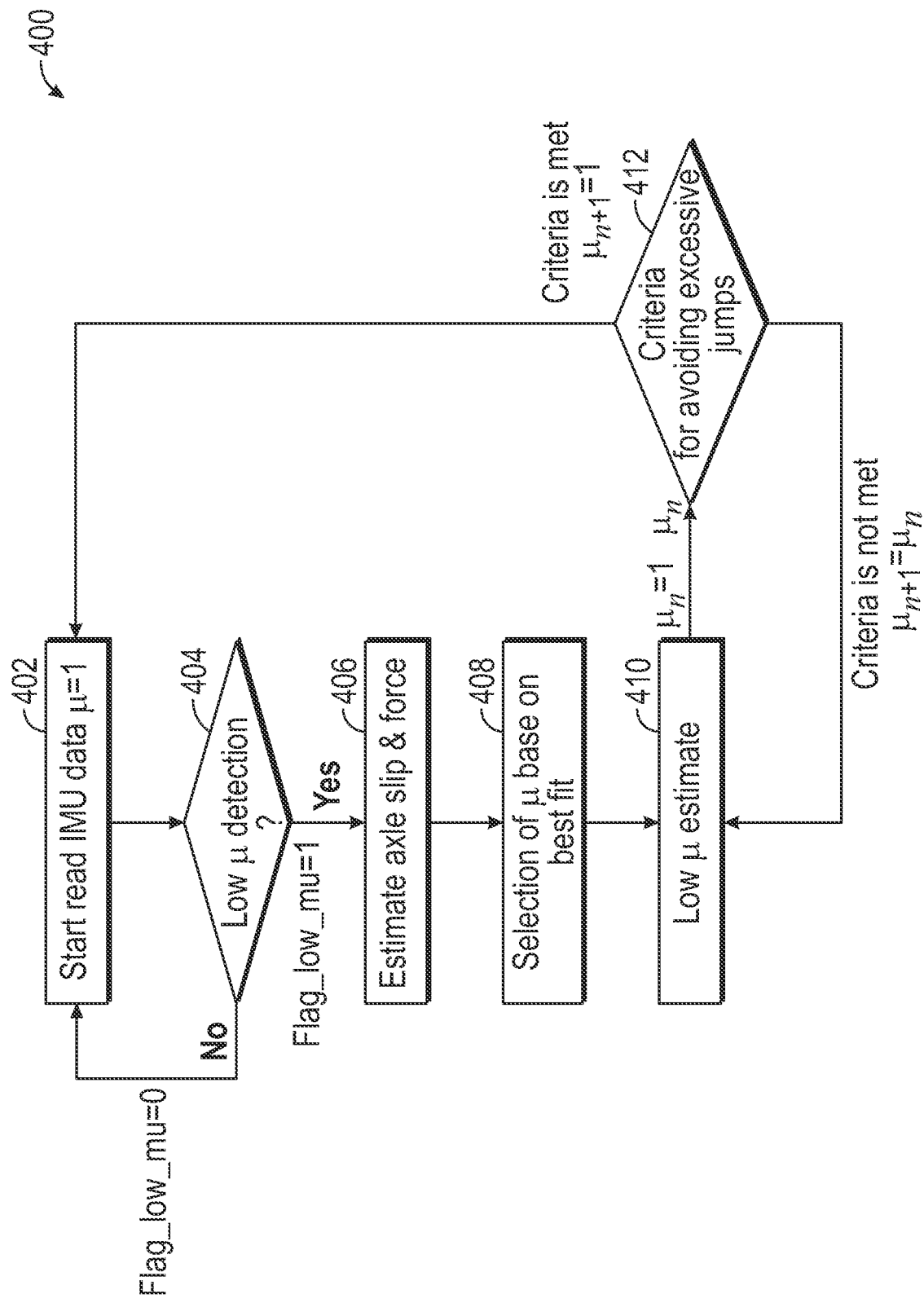
FIG. 4 shows a flowchart of a method for estimating a coefficient of friction between the vehicle and the road.

FIG. 4 shows a flowchart 400 of a method for estimating a coefficient of friction between the vehicle and the road, as performed in the vehicle state estimation module 308 of FIG. 3. The method begins at box 402, in which data is obtained of various dynamic parameters of the vehicle. In an embodiment, the data is obtained using a sensor such as an Inertial Measurement Unit (IMU) and can include parameters such as forces, accelerations, angular rates, orientation, speeds, etc. on the vehicle using sensors such as accelerometers, gyroscopes, magnetometers, etc. These measurements can be made along three degrees of freedom or 6 degrees of freedom, in various embodiments. In box 402, the coefficient of friction is initially set at $\mu=1$.

In box 404, the dynamic parameters are used to determine whether the vehicle is experiencing a low coefficient of friction. A flag is set when the vehicle is experiencing this low coefficient of friction. The flag can be set when a difference between measured parameters and a model-based estimate of the parameters exceeds a selected threshold. In an embodiment, the parameters include a yaw rate of the vehicle and a time-derivate of the yaw rate. In another embodiment, the parameters include a rotation rate of a wheel and a time-derivate of the rotation rate.

The flag is set to 'Flag=0' when a difference between measured parameters and a model-based estimate of the parameters is less than the threshold (i.e., when a high friction state is detected). If the high friction state is detected, the method loops back to box 402 to obtain further measurements. The flag is set to 'Flag=1' when the difference between measured parameters and the model-based estimate is greater than or equal to the threshold (i.e., when a low friction state is detected). If the low friction state is detected, the method continues to box 406.

In box 406, a dynamic estimate of force on the tire is made using the dynamic parameter measurements. Also, an estimate is made of slip angle for the tire using the dynamic parameter measurements.

In box 408, an estimate for the coefficient of friction is determined. The estimate is determined from the dynamic estimate of force obtained in box 406 and a model-based estimate of force. The model-based estimate of force is based in part of the slip angle obtained in box 406. In various embodiments, the value that is determined for the coefficient of friction is the value that reduces, minimizes, or substantially minimizes a difference between the dynamic estimate of force and the model-based estimate of force. In an embodiment, this value can be determined using any suitable optimization method applied to a cost function based on a difference between the dynamic estimate of force and the model-based estimate of force.

In box 410, the low friction estimate is obtained and provided to a selection criterion in box 412. In box 412, an algorithm is used to determine the actual coefficient of friction at the tires, which can be represented either by a high friction coefficient (e.g., $\mu_n=1$, where n is an iteration index) or by the low friction coefficient estimated in box 410. The algorithm applies a criterion to avoid jumping excessively between the high friction coefficient and the efficient low coefficient, as explained herein. When the high friction coefficient is used, the method returns to box 402 (with $\mu_{n+1}=1$). When the low friction coefficient is used, the method returns to box 410 (with $\mu_{n+1}=\mu_n$).

Figure 5:
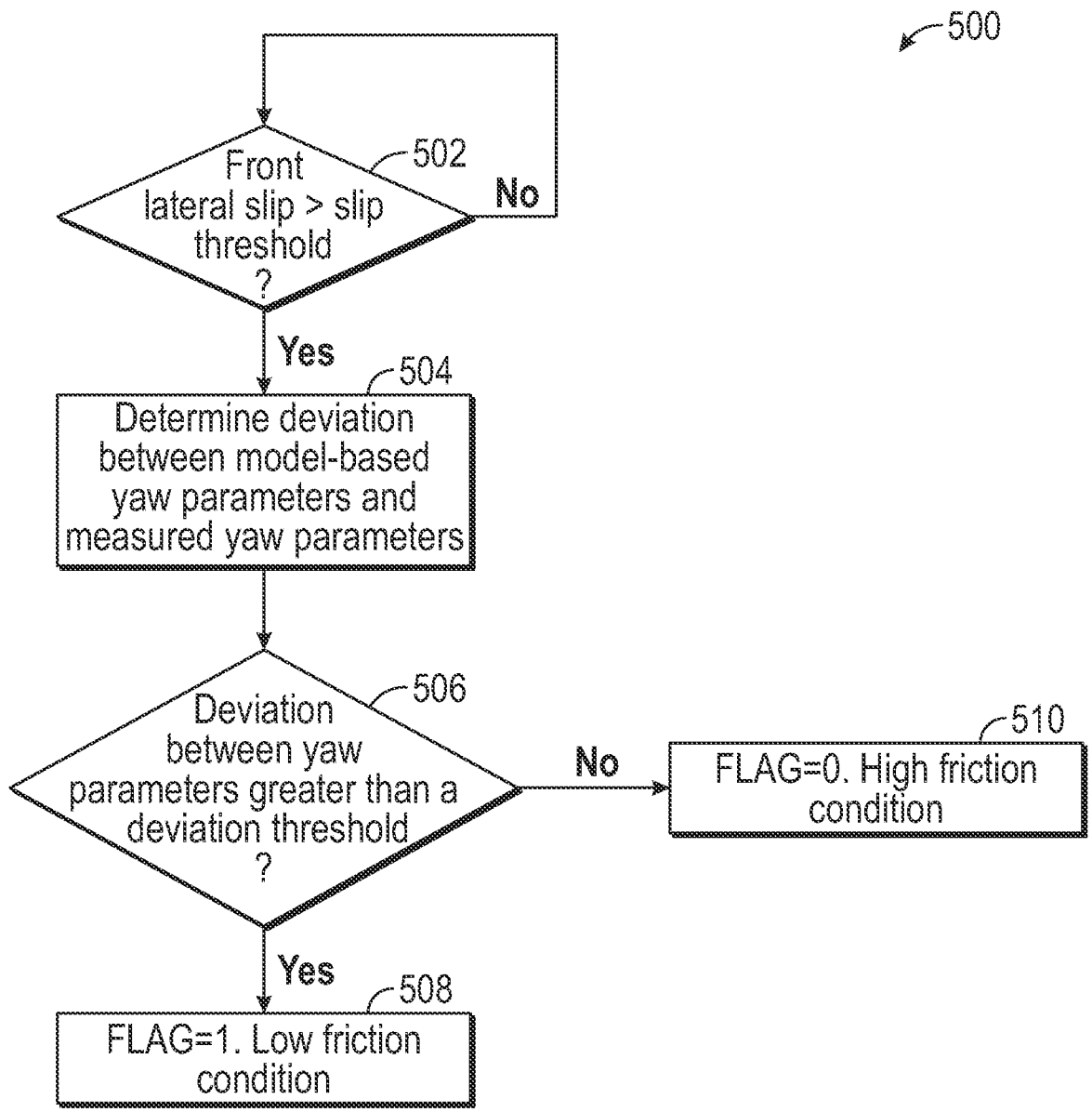
FIG. 5 shows a flowchart for a method of determining a low-friction condition.

FIG. 5 shows a flowchart 500 for a method of determining a low-friction condition, as performed in box 404. The low-friction condition is determined by comparing measured yaw parameters to predicted or model-based yaw parameters. In box 502, a lateral slip of the front wheel is determined. If the lateral slip is less than or equal to a slip threshold, the method loops back to box 502. If the lateral slip is greater than the slip threshold, the method proceeds to box 504. In box 504, a deviation is determined between measured yaw parameters and the model-based yaw parameter. In one embodiment, a non-linear bicycle model is used to compute the model-based yaw parameters, as shown in Eqs. (1) and (2):

$$M\dot{V}_y = M\dot{\psi}V_x + F_{yf}(\alpha_f)\cos(\delta) + F_{yf}(\alpha_r) - Mg\cos(\theta)\sin(\varphi) \qquad \text{Eq. (1)}$$

$$I_z\ddot{\psi} = aF_{yf}(\alpha_f) - bF_{yf}(\alpha_r) \qquad \text{Eq. (2)}$$

where M is the mass of the vehicle, $V_x$ is the longitudinal velocity of the vehicle, $\dot{V}_y$ is the time-derivative of the lateral velocity of the vehicle, is $\dot{\psi}$ is the yaw rate, $\ddot{\psi}$ is the time-derivative of the yaw rate or the yaw angular acceleration, $\alpha_f$ is the slip angle of the front tires, $\alpha_r$ is the slip angle of the rear tires and g is the gravitational constant. It is to be understood that other models can also be used to determine the yaw rate parameters, in various embodiments.

The non-linear bicycle model of Eqs. (1) and (2) receives input in the form of the steering angle $\delta$ and assumes a coefficient of friction of $\mu=1$. The output of the non-linear bicycle model is a lateral velocity $V_y$, the model-based yaw rate $\dot{\psi}_b$ and the model-based time-derivative of the yaw $\ddot{\psi}_b$ (or model-based yaw acceleration). A measured yaw rate $\dot{\psi}$ (or measured yaw angular velocity) and measured time-derivative of the yaw rate $\ddot{\psi}$ (or measured yaw acceleration) are obtained at the vehicle using, for example, the Inertial Measurement Unit (IMU). A metric m between these values is computed as shown in Eq. (3):

$$m = \sqrt{(\dot{\psi}_b - \dot{\psi})^2 - (\ddot{\psi}_b - \ddot{\psi})^2} \qquad \text{Eq. (3)}$$

In box 506, the metric is compared to a yaw deviation threshold. When the metric is greater than the yaw deviation threshold and the absolute value of the slip angle is greater than one, then the method proceed to box 508 in which the flag is set to 1 ("FLAG=1") to indicate a low friction condition. Returning to box 506, when the metric is less or equal to the yaw deviation threshold, then the method proceeds to box 510 in which the flag is set to 0 ("FLAG=0") to indicate a high friction condition.

Figure 6:
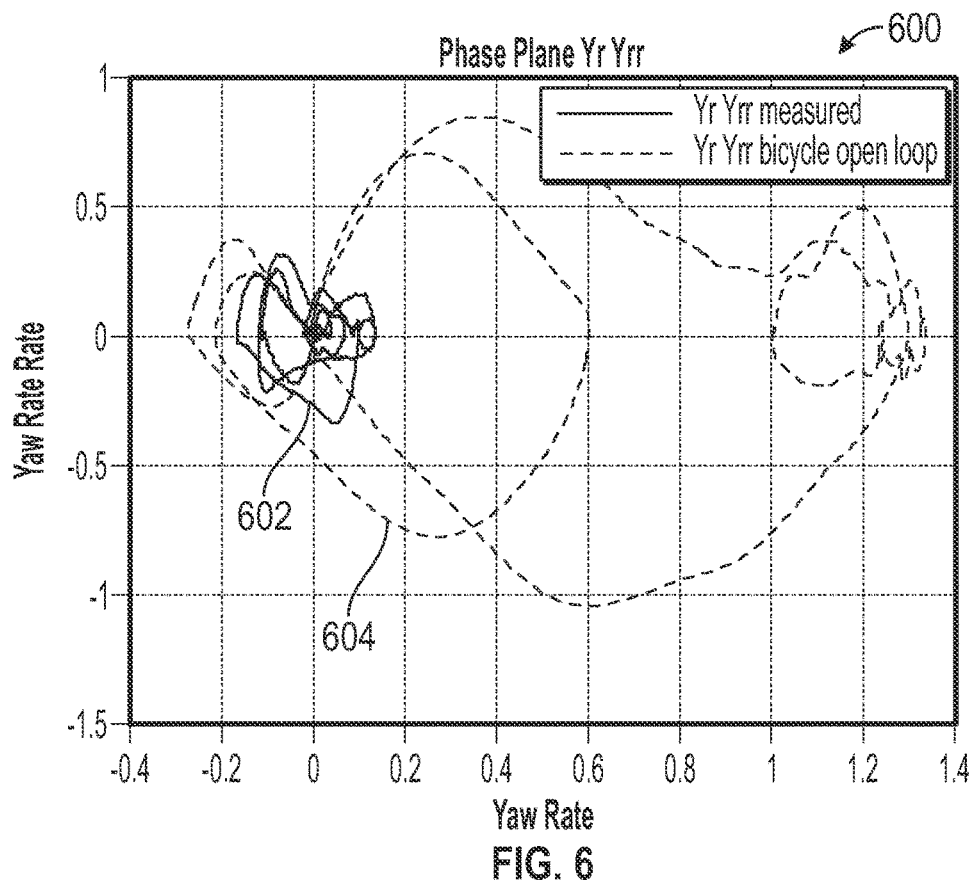
FIG. 6 shows a phase plot for yaw parameters for a low-friction road, such as an icy road.

FIG. 6 shows a phase plot 600 for yaw parameters for a low-friction road, such as an icy road. Yaw rate is shown along the x-axis and the differential yaw rate is shown along the y-axis. The phase plot includes a first curve 602 representative of measured yaw rate and measured differential yaw rate (time-derivative of the yaw rate). A second curve 604 represents yaw rate and differential yaw rate that is determined from a model, such as the non-linear bicycle model. It is evident from FIG. 6 that there are many occasions at which the first curve 602 and the second curve 604 deviate from each other by a considerable amount due to the ice on the road.

Figure 7:
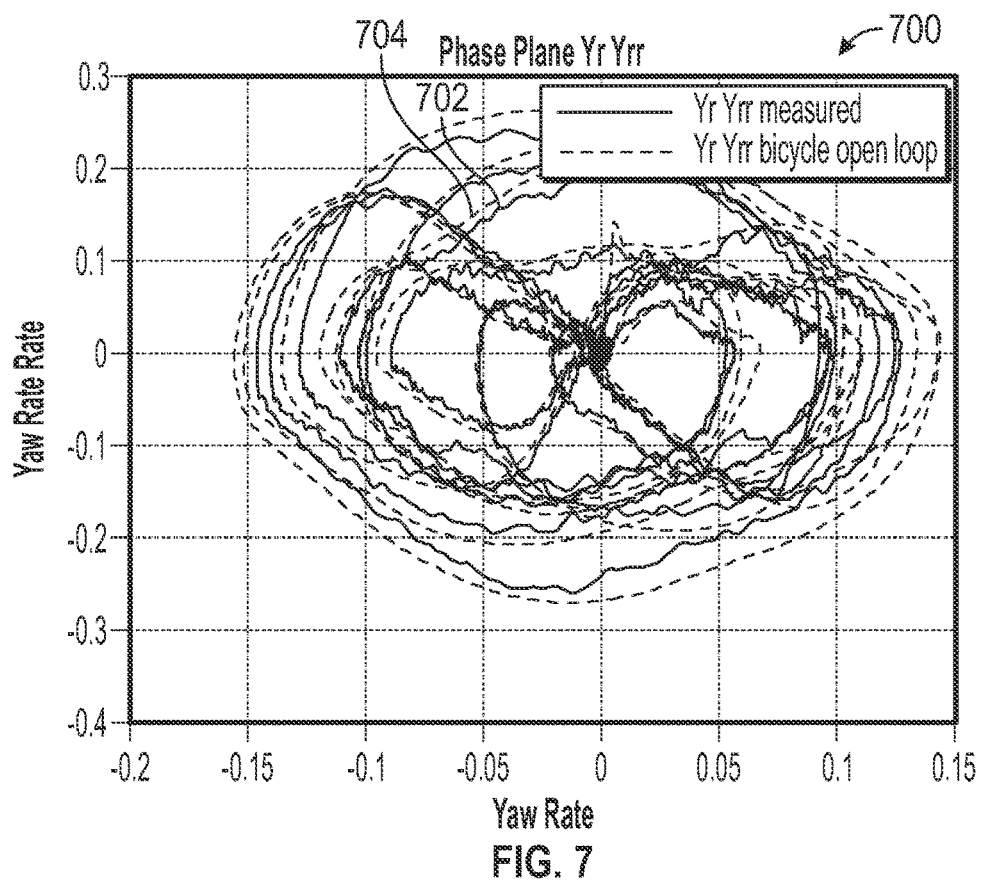
FIG. 7 shows a phase plot for yaw rate and differential yaw rate for a high-friction road.

FIG. 7 shows a phase plot 700 for yaw rate and differential yaw rate for a high-friction road. Yaw rate is shown along the x-axis and the differential yaw rate is shown along the y-axis. A first curve 702 is representative of measured yaw rate and measured differential yaw rate. A second curve 704 represents yaw rate and differential yaw rate that is determined from the model. The first curve 702 and the second curve 704 remain very close to each other throughout and rarely deviate from each other by an amount that exceeds a selected yaw deviation threshold.

For the phase plots of FIGS. 6 and 7, the metric of Eq. (3) can be used to determines a deviation between the first curves (602, 702) and the second curves (604, 704) and compares the deviation to a yaw deviation threshold. When the deviation is greater than the yaw deviation threshold, a flag is set (i.e., "FLAG=1") to indicate that a low-friction condition is being experienced. When the deviation is less than the yaw deviation threshold, a flag is removed (i.e., "FLAG=0") to indicate that a high-friction condition is being experienced.

The process of estimating the forces on the wheel performed in box 406 is discussed with respect to Eqs. (4)-(5). The lateral force $\hat{F}_{yf}$ on the front wheel (e.g., left front wheel 208 or right front wheel 210) can be determined from the lateral acceleration, yaw rate and steering angle, as shown in Eq. (4):

$$\hat{F}_{yf} = (bMA_y + I_z\ddot{\psi})/((a+b)\cos\delta) \quad (4)$$

where M is the mass of the vehicle, $A_y$ is the measured lateral acceleration of the vehicle, $I_z$ is the moment of inertia of the vehicle about the z axis, $\ddot{\psi}$ is the measured yaw rate, and $\delta$ is the steering angle. The lateral acceleration and steering angle can be determined from vehicle sensors. Similarly, the lateral force $\hat{F}_{yr}$ on the rear wheel is determined using Eq. (5):

$$\hat{F}_{yr} = (aMA_y - I_z\ddot{\psi})/(a+b) \quad (5)$$

The slip angle is a difference between a direction of the movement of wheel and a direction in which the wheel is pointed. An estimate of slip angle $\hat{\alpha}_f$ for the front tire can be obtained using Eq. (6):

$$\hat{\alpha}_f = \delta_f - \hat{V}_y/V_x - a\dot{\psi}/V_x \quad (6)$$

where $\delta_f$ is the steering angle of the front tire, $\hat{V}_y$ is an estimate of the lateral velocity of the vehicle, $V_x$ is the measured forward velocity of the vehicle, and $\dot{\psi}$ is the yaw rate. Similarly, an estimate of slip angle $\hat{\alpha}_r$ for rear tire can be obtained using Eq. (7):

$$\hat{\alpha}_r = \delta_r - \hat{V}_y/V_x + b\dot{\psi}/V_x \quad (7)$$

where $\delta_r$ is the steering angle of the rear tire. Using a model of tire forces, the lateral force on the front tire is given by Eq. (8):

$$F_{yf}(\alpha_f) = c_f \tanh\left(\frac{1}{\mu}d_f\alpha_f\right) \quad (8)$$

where $c_f$ and $d_f$ are model coefficients. Similarly, a lateral force on the rear tire is given by Eq. (9):

$$F_{yr}(\alpha_r) = c_r \tanh\left(\frac{1}{\mu}d_r\alpha_r\right) \quad (9)$$

where $c_r$ and $d_r$ are model coefficients.

Figure 8:
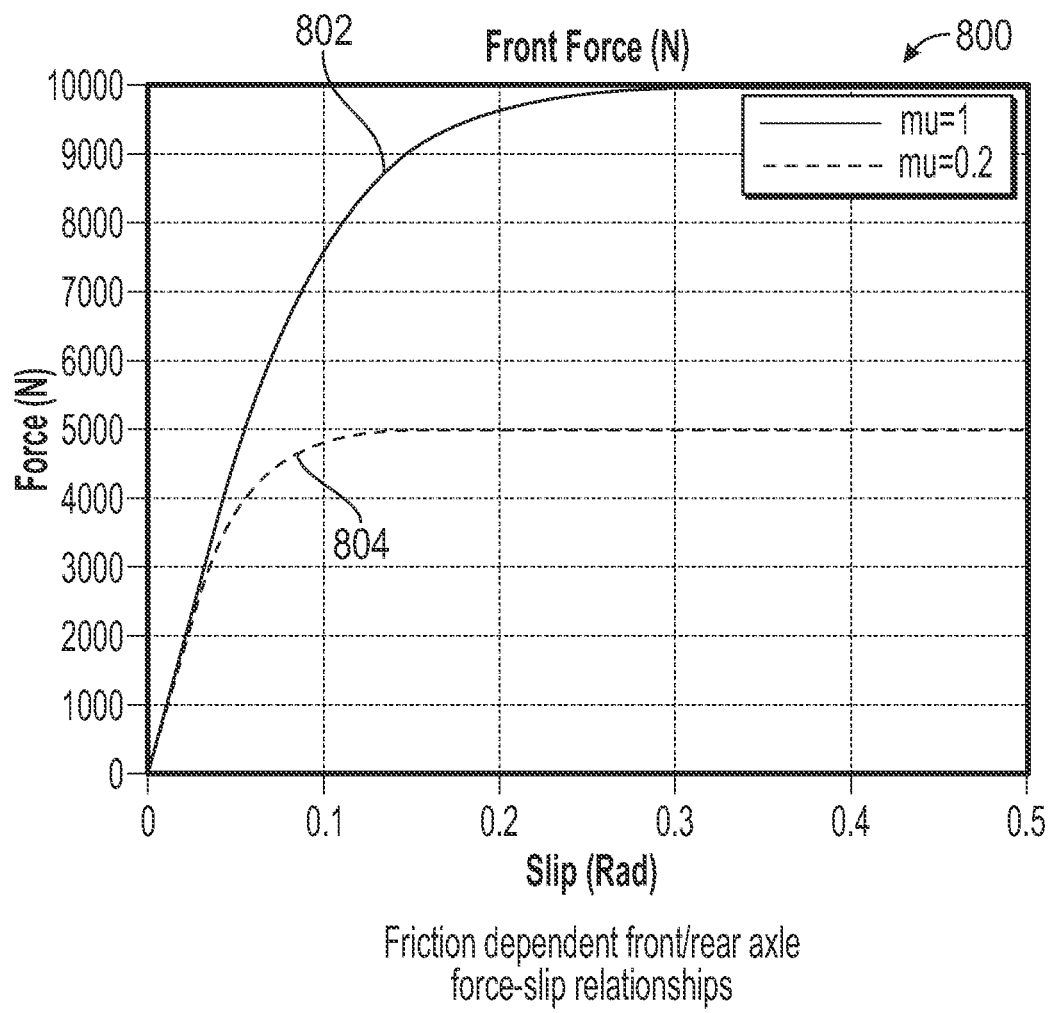
FIG. 8 shows a graph of model-based lateral forces on a tire.

FIG. 8 shows a graph 800 of model-based lateral forces on a tire. The slip angle is shown in radians (rad) along the x-axis and the force is shown in Newtons (N) along the y-axis. Curve 802 represents the lateral forces on the tire for a high coefficient of frication (e.g., $\mu=1$) and curve 804 represents the lateral forces on the tire for a low coefficient of friction (e.g., $\mu=0.2$).

Eq. (10) shows an optimization method for locating an estimate $\hat{\mu}_f$ of the coefficient of friction at the front wheel.

$$\hat{\mu}_f = \underset{\mu}{\operatorname{argmin}} \left| \hat{F}_{yf} - c_f \tanh\left(\frac{1}{\mu}d_f\hat{\alpha}_f\right) \right| \quad (10)$$

The optimization method of Eq. (10) locates a value of the coefficient of friction that reduces or minimizes a difference between the measured lateral tire force of Eq. (4) and the modeled the lateral tire force of Eq. (8). Similarly, Eq. (11) shows an optimization method for locating an estimate $\hat{\mu}_r$ of the coefficient of friction at the rear wheel.

$$\hat{\mu}_r = \underset{\mu}{\operatorname{argmin}} \left| \hat{F}_{yr} - c_r \tanh\left(\frac{1}{\mu}d_r\hat{\alpha}_r\right) \right| \quad (11)$$

The optimization method of Eq. (11) locates a value of the coefficient of friction that reduces or minimizes a difference between the measured lateral tire force of Eq. (5) and the modeled the lateral tire force of Eq. (9). An overall estimate of coefficient of friction $\hat{\mu}$ can be a minimum value of the coefficients determined in Eqs. (10) and (11), as shown in Eq. (12):

$$\hat{\mu} = \min(\hat{\mu}_f, \hat{\mu}_r) \quad (12)$$

A similar estimate of coefficient of friction can be determined using longitudinal forces. A longitudinal slip ratio can be determined using Eq. (13):

$$\sigma = (R\omega - V_x)/\max(R\omega, V_x) \quad (13)$$

where R is the radius of the wheel, $\omega$ is the rotation rate or rotational velocity of the wheel and $V_x$ is the longitudinal velocity of the vehicle. A nonlinear longitudinal model can be used to determine the rotational velocity $\omega$ of the wheel. The nonlinear longitudinal model receives a torque T on the vehicle as input and assumes a coefficient of friction $\mu=1$. The model outputs a model rotational velocity $\omega_b$ and time-derivative of rotational velocity $\dot{\omega}_b$. These parameters can be compared to corresponding measurements of rotational velocity $\omega$ and time-derivative of rotational velocity $\dot{\omega}$. A metric can be used to determine the deviation between the modeled parameters and measured parameters, as shown in Eq. (14):

$$m = \sqrt{(\omega_b - \omega)^2 - (\dot{\omega}_b - \dot{\omega})^2} \quad (14)$$

The metric m can be compared to a rotational velocity deviation threshold to determine when the wheel is in a low friction condition, using the same methods disclosed herein with respect to the yaw parameters. Once the metric is determined to be greater than the rotational velocity deviation threshold, the longitudinal forces on the tires can be used to determine coefficient of friction.

The dynamic longitudinal forces on the wheel are given in Eq. (15):

$$\hat{F}_x = (T - I_w\dot{\omega})/R \quad (15)$$

where T is a rotational torque on the wheel, $I_w$ is the rotational inertia of the wheel and R is the radius of the wheel. A model of the longitudinal force on a front tire is given by Eq. (16):

$$F_{xf}(\sigma_f) = c_f \tanh\left(\frac{1}{\mu}d_f\sigma_f\right) \quad (16)$$

A model of the longitudinal force on a rear tire is given by Eq. (17):

$$F_{yr}(\sigma_r) = c_r \tanh\left(\frac{1}{\mu}d_r\sigma_r\right) \quad (17)$$

The coefficient of friction can be determined by minimizing a difference between the modeled longitudinal force and the measured longitudinal force, as shown in Eq. (18):

$$\hat{\mu}_f = \underset{\mu}{\operatorname{argmin}}\left|\hat{F}_x - c_f \tanh\left(\frac{1}{\mu}d_f\hat{\sigma}_f\right)\right| \quad (18)$$

Eq. (18) can be applied to both front and rear tires separately.

Figure 9:
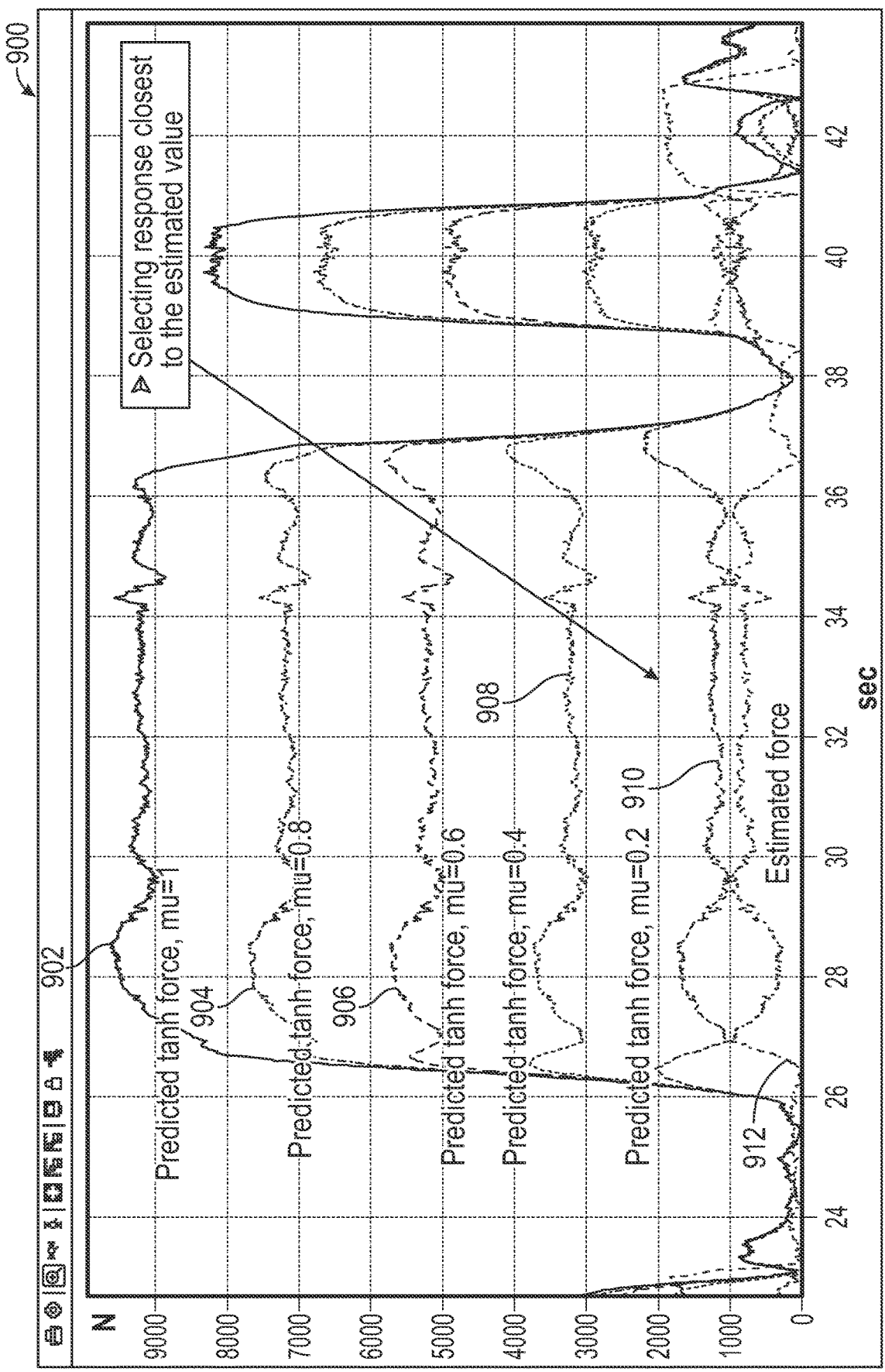
FIG. 9 shows a chart illustrating operation of an optimization method for lateral forces.

FIG. 9 shows a chart 900 illustrating operation of an optimization method for lateral forces. Force is shown in Newtons (N) along the y-axis and time is shown in seconds (sec) along the x-axis. Curve 902 shows a predicted force for a coefficient of friction of µ=1 between the tire and the road. Curve 904 shows a predicted force for a coefficient of friction of µ=0.8. Curve 906 shows a predicted force for a coefficient of friction of µ=0.6. Curve 908 shows a predicted force for a coefficient of friction of µ=0.4. Curve 910 shows a predicted force for a coefficient of friction of µ=0.2. Curve 912 shows the measured forces on the tire. The predicted force for µ=0.2 (curve 910) best matches with the measured forces (curve 912).

Figure 10:
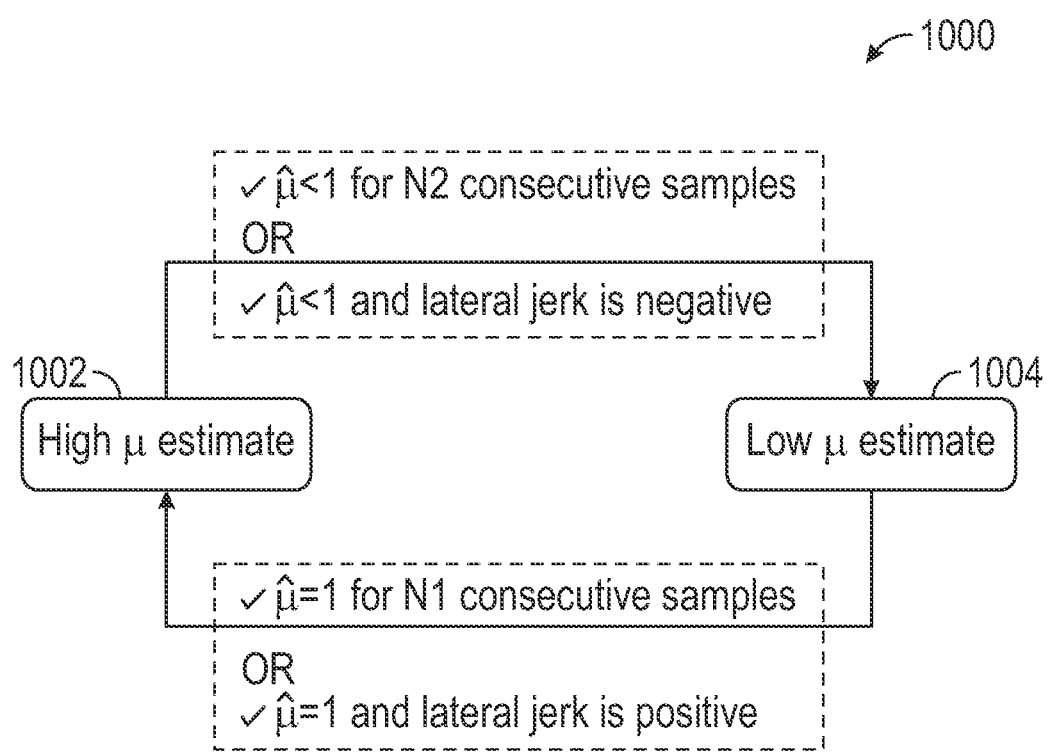
FIG. 10 shows a flow chart for a method of preventing excessive flips between low and high coefficient of friction estimations.

FIG. 10 shows a flow chart 1000 for a method of preventing excessive flips between low and high coefficient of friction estimations. At each iteration of the flowchart 400 of FIG. 4, the criterion is checked to see if the output coefficient of friction is to be changed (i.e., in box 412). The criterion is used to move between outputting a high coefficient of friction 1002 and a low coefficient of friction 1004. When the method is currently outputting a high coefficient of friction and the estimate generated using the steps disclosed herein (e.g., via any of Eqs. (10), (11), (12) and (18)) meets a first set of conditions, then the method switches to outputting an estimate of the low coefficient of friction. The first set of conditions includes either the estimate being less than 1 for a selected number of sample time or the estimate being less than 1 while a lateral jerk on the vehicle is negative. The selected number of sample times can be a tunable parameter. A sample time is a time interval in which the measurement can calculations of friction are performed. The measurements and calculations can be performed several times per second, for example.

Similarly, when the method currently is outputting a low coefficient of friction and the estimate generated used the steps disclosed herein meets a second set of conditions, then the method switches to outputting the high coefficient of friction. The second set of conditions includes either the estimate being equal to 1 for a selected number of sample times or the estimate being equal to 1 while a lateral jerk on the vehicle is positive.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling a vehicle, comprising:
   obtaining a measured yaw rate, a measured time derivative of the yaw rate, and a slip angle of the vehicle based on dynamics of the vehicle;
   obtaining a model-based yaw rate and a model-based time derivative of the yaw rate for the vehicle using a tire model;
   determining a metric based on a difference between the measured yaw rate and the model-based yaw rate and a difference between the measured time derivative of the yaw rate and the model-based time derivative of the yaw rate;
   determine a low friction condition when the metric is greater than a threshold value and an absolute value of the slip angle is greater than one; and
   controlling the vehicle based on the low friction condition.

2. The method of claim 1, further comprising determining an estimate of a coefficient of friction by reducing a difference between a first estimate of a force on a tire of the vehicle obtained based on dynamics of the vehicle and a second estimate of the force based on the tire model.

3. The method of claim 2, wherein the second estimate of the force is based on a measured slip angle of the tire.

4. The method of claim 2, wherein the force is at least one of: (i) a front lateral force on a front tire; (ii) a rear lateral force on a rear tire; (iii) a front longitudinal force on the front tire; and (iv) a rear longitudinal force on the rear tire.

5. The method of claim 2, further comprising outputting the estimate of the coefficient of friction when at least one of: (i) the estimate is less than one for a selected number of sample times; and (ii) the estimate is less than one when a jerk occurring at the vehicle is negative.

6. The method of claim 1, wherein the tire model is a non-linear tire model.

7. A system for controlling a vehicle, comprising:
   a sensor for obtaining a measured yaw rate and a measured time derivative of the yaw rate of the vehicle based on dynamics of the vehicle;
   a processor configured to:
   obtain model-based yaw rate and a model-based time derivative of the yaw rate for the vehicle using a tire model;
   determine a slip angle of the vehicle;
   determine a metric based on a difference between the measured yaw rate and the model-based yaw rate and a difference between the measured time derivative of the yaw rate and the model-based time derivative of the yaw rate;
   determine a low friction condition when the metric is greater than a threshold value and an absolute value of the slip angle is greater than one; and
   control the vehicle-based on the low friction condition.

8. The system of claim 7, wherein the processor is further configured to determine an estimate of a coefficient of friction by reducing a difference between a first estimate of a force on a tire of the vehicle based on dynamics of the vehicle and a second estimate of the force based on the tire model.

9. The system of claim 8, wherein the second estimate of the force is based on a measured slip angle of the tire.

10. The system of claim 8, wherein the force is at least one of: (i) a front lateral force on a front tire; (ii) a rear lateral force on a rear tire; (iii) a front longitudinal force on the front tire; and (iv) a rear longitudinal force on the rear tire.

11. The system of claim 8, wherein the processor is further configured to output the estimate of the coefficient of friction when at least one of: (i) the estimate is less than one for a selected number of sample times; and (ii) the estimate is less than one when a jerk occurring at the vehicle is negative.

12. The system of claim 7, wherein the tire model is a non-linear tire model.

13. A vehicle, comprising:
- a sensor for obtaining a measured yaw rate and a measured time derivative of the yaw rate of the vehicle based on dynamics of the vehicle;
- a processor configured to:
- obtain a model-based yaw rate and a model-based time derivative of the yaw rate of the vehicle using a tire model;
- determine a slip angle of the vehicle;
- determine a metric based on a difference between the measured yaw rate and the model-based yaw rate and a difference between the measured time derivative of the yaw rate and the model-based time derivative of the yaw rate;
- determine a low friction condition when the metric is greater than a threshold value and an absolute value of the slip angle is greater than one; and
- control the vehicle-based on the low friction condition.

14. The vehicle of claim 13, wherein the processor is further configured to determine an estimate of a coefficient of friction by reducing a difference between a first estimate of a force on a tire of the vehicle based on dynamics of the vehicle and a second estimate of the force based on the tire model.

15. The vehicle of claim 14, wherein the second estimate of the force is based on a measured slip angle of the tire.

16. The vehicle of claim 14, wherein the force is at least one of: (i) a front lateral force on a front tire; (ii) a rear lateral force on a rear tire; (iii) a front longitudinal force on the front tire; and (iv) a rear longitudinal force on the rear tire.

17. The vehicle of claim 14, wherein the processor is further configured to output the estimate of the coefficient of friction when at least one of: (i) the estimate is less than one for a selected number of sample times; and (ii) the estimate is less than one when a jerk occurring at the vehicle is negative.

\* \* \* \* \*